United States Patent [19]
Ma

[11] Patent Number: 5,796,454
[45] Date of Patent: Aug. 18, 1998

[54] CHOLESTERIC LIQUID CRYSTAL DISPLAY EMPLOYING CIRCULAR POLARIZER AND METHODS OF OPERATION AND MANUFACTURE THEREFOR

[75] Inventor: Yao-Dong Ma, Richardson, Tex.

[73] Assignee: Advanced Display Systems, Inc., Amarillo, Tex.

[21] Appl. No.: 767,111

[22] Filed: Dec. 4, 1996

[51] Int. Cl.[6] .............................. G02F 1/1335; G02F 1/13
[52] U.S. Cl. ............................... 349/98; 349/176
[58] Field of Search ............................ 349/98, 176, 175

[56] References Cited

U.S. PATENT DOCUMENTS

| | | | |
|---|---|---|---|
| 4,139,272 | 2/1979 | Laesser et al. | 349/176 |
| 4,726,663 | 2/1988 | Buzak | 349/176 |
| 5,200,844 | 4/1993 | Suvada | 349/176 |
| 5,459,591 | 10/1995 | Faris | 349/176 |

*Primary Examiner*—Anita Pellman Gross
*Attorney, Agent, or Firm*—Hitt Chwang & Gaines, P.C.

[57] ABSTRACT

A cholesteric liquid crystal display ("LCD") and methods of operating and manufacturing the LCD. The LCD includes: (1) a controllable cholesteric liquid crystal (CLC) located between first and second substrates, the controllable CLC selectively exhibiting an "on" state and an "off" state and having a circular polarity of a predetermined handedness when the controllable CLC is in the "on" state and (2) a circular polarizer, located proximate the first substrate and having a circular polarity of a particular handedness, that cooperates with the controllable CLC to increase the difference between the relative brightness of the "on" state and the "off" state, whereby a contrast ratio of the cholesteric LCD is increased.

60 Claims, 5 Drawing Sheets

700

CHOLESTERIC LIQUID CRYSTAL DISPLAY EMPLOYING CIRCULAR POLARIZER AND METHODS OF OPERATION AND MANUFACTURE THEREFOR

TECHNICAL FIELD OF THE INVENTION

The present invention is directed, in general, to liquid crystal displays and, more specifically, to a cholesteric liquid crystal display ("LCD") that employs a circular polarizer and methods of operation and manufacture for the cholesteric LCD.

BACKGROUND OF THE INVENTION

The development of improved low-power-consumption liquid crystal ("LC") flat-panel displays is an area of very active research, driven in large part by the proliferation of and demand for portable electronic appliances, including computers and wireless telecommunications devices. Moreover, as the quality of LC displays improves, and the cost of manufacturing declines, it is projected that LC displays may eventually displace conventional display technologies, such as cathode-ray-tubes.

Cholesteric liquid crystal ("CLC") technology is a particularly-attractive candidate for many display applications. Cholesteric liquid crystals may be used to provide bi-stable and multi-stable displays that, due to their non-volatile "memory" characteristic, do not require a continuous driving circuit to maintain a display image, thereby significantly reducing power consumption. Moreover, some CLC displays may be easily viewed in ambient light without the need for back-lighting. The elimination of the need for back-lighting is particularly significant in that lighting requirements typically represent about 90% of the total power consumption of conventional LC displays.

One aspect of the quality of LC displays to which significant research has been directed in recent years is the "contrast" of such displays. The contrast of a display is a relative measurement of the difference between luminance values for the brightest and darkest regions of the display. One way to measure the contrast of a display is to find the difference in brightness between an "on" and an "off" pixel, divided by the larger of the two values. Typically, an "on" pixel corresponds to a brightly-lit pixel; however, the conventional "on" and "off" states may be reversed in some types of projection and back-lit displays. A more useful value is the "contrast ratio," which is simply the larger brightness divided by the smaller brightness. LCD designers desire this ratio to be as large as possible in order to obtain "blacker blacks" and "whiter whites."

Several components, and characteristics, of conventional LCD structures present limitations to achieving higher contrast ratios. LC displays are constructed by trapping a thin film of liquid crystal between two substrates of glass or transparent plastic. These substrates are usually manufactured with transparent electrodes, typically made of indium tin oxide ("ITO"). Unfortunately, the substrates and electrodes reflect a portion of the incident light back towards the display observer, which reduces the display contrast ratio. Additionally, when a display pixel is turned "off," the randomly-oriented LC molecules scatter the incident light. Some of the scattered light is "back-scattered" towards the display observer, further reducing the display contrast ratio.

Therefore, what is needed in the art is a way of improving the contrast ratio of CLC displays.

SUMMARY OF THE INVENTION

To address the above-discussed deficiencies of the prior art, it is a primary object of the present invention to take advantage of the intrinsic "handedness" of the CLC to achieve a higher contrast ratio in a LCD.

In the attainment of the above-described primary object, the present invention provides a cholesteric LCD and methods of operating and manufacturing the LCD. The LCD includes: (1) a controllable cholesteric liquid crystal (CLC) located between first and second substrates, the controllable CLC selectively exhibiting an "on" state and an "off" state and having a circular polarity of a predetermined handedness when the controllable CLC is in the "on" state and (2) a circular polarizer, located proximate the first substrate and having a circular polarity of a particular handedness, that cooperates with the controllable CLC to increase the difference between the relative brightness of the "on" state and the "off" state, whereby a contrast ratio of the cholesteric LCD is increased.

The present invention therefore introduces the broad concept of combining a circular polarizer with a controllable CLC. Depending upon the relationship of the predetermined handedness of the CLC and the particular handedness of the circular polarizer, and the mode of operation of the LCD (transmissive or reflective), the present invention yields a number of advantageous display embodiments.

As used herein, "on" and "off" refer to the relative states of local domains within the CLC. Those skilled in the art recognize that each local domain of a CLC may be composed of molecules in both the planar ("on") and focal-conic ("off") states, or "textures." A multi-stable CLC is capable of displaying "gray scale" images, wherein each particular region, or "pixel," can be driven to a desired gray scale level by selectively forcing the transition of CLC molecules from the planar to the focal-conic texture, and vice versa; a bi-stable CLC display being capable of exhibiting two states. Because each display pixel may be composed of molecules in the planar and focal-conic textures, the light reflection and transmission characteristics for both the "on" and "off" states, as described hereinafter, may actually occur simultaneously in a display pixel; the resulting appearance of each pixel being a composite of the two states. For example, if a substantial portion of the molecules in a local domain are in the planar texture, the pixel appearance will correspond to one extreme of the gray scale; if a substantial portion of the molecules in a local domain are in the focal-conic texture, the pixel appearance will correspond to the other extreme of the gray scale; intermediate gray scale levels corresponding to the relative proportion of molecules in the planar and focal-conic textures.

In one embodiment of the present invention, the LCD further comprises: (1) a second circular polarizer located between third and fourth substrates and on an opposite side of the second substrate from the controllable CLC and having an arbitrary handedness and (2) a reflector located on an opposite side of the second circular polarizer from the second substrate, the second circular polarizer and the reflector cooperating to absorb light transmitted through the controllable CLC. Alternatively, a light-absorbing surface can be located on the opposite side of the second substrate from the controllable CLC. The combination of a second circular polarizer and a reflector, however, results in a light-absorptive structure that substantially reduces heat build-up during operation.

In one embodiment of the present invention, the predetermined handedness equals the particular handedness, the controllable CLC reflecting wavelengths of light corresponding to an intrinsic color and transmitting all other wavelengths of light when the controllable CLC is in the "on" state, the LCD adapted to cooperate with a projector to project the light of all other wavelengths when the controllable CLC is in the "on" state, the LCD scattering the light when the controllable CLC is in the "off" state. This embodiment introduces a subtractive-mode mono-color CLC projection display.

In one embodiment of the present invention, the predetermined handedness is opposite the particular handedness, the LCD adapted to cooperate with a projector to project white light when the controllable CLC is in the "on" state, the LCD scattering the light when the controllable CLC is in the "off" state. This embodiment introduces a black-and-white CLC projection display, the black portion produced by virtue of the scattering of light and a small light-collection angle for the projector.

In one embodiment of the present invention, the LCD further comprises a color filter proximate the controllable CLC, the color filter causing the LCD to cooperate with the projector to project a colored light when the controllable LC is in the "on" state, the LCD scattering the colored light when the controllable CLC is in the "off" state. A color filter may therefore be added to the previous embodiment to transform the black-and-white CLC projection display into a color CLC projection display. In a related embodiment of the present invention, the color filter is a multi-color filter, the multi-color filter causing the LCD to cooperate with the projector to project a multi-colored light when the controllable CLC is in the "on" state, the LCD scattering the colored light when the controllable CLC is in the "off" state. The color display may therefore be multicolored.

In one embodiment of the present invention, the LCD further comprises a second circular polarizer located on an opposite side of the second substrate from the controllable CLC and having a handedness that is opposite the predetermined handedness and the particular handedness, the second circular polarizer blocking light transmitted through the controllable CLC when the controllable CLC is in the "on" state. In an embodiment to be illustrated and described, the second circular polarizer provides substantial attenuation of light transmitted through regions of the controllable CLC in the "on" state, yielding a black-and-white transmissive-mode LCD.

In one embodiment of the present invention, the LCD further comprises a color filter proximate the controllable CLC, the color filter causing the LCD to transmit a colored light when the controllable LC is in the "off" state. A color filter can be added to the previous embodiment to yield a color LCD. In a related embodiment of the present invention, the color filter is a multicolor filter, the color filter causing the LCD to transmit a multi-colored light when the controllable CLC is in the "off" state. The color display may therefore be multi-colored.

In one embodiment of the present invention, the LCD further comprises a polymer dispersed LC ("PDLC"), located between third and fourth substrates and on an opposite side of the second substrate from the controllable CLC, that allows the LCD to operate: (1) in a reflective mode wherein the PDLC is placed in a substantially opaque state and (2) in a transmissive mode wherein the PDLC is placed in a substantially transparent state and light passing through the PDLC and the controllable CLC passes through the circular polarizer. As those skilled in the art are aware, PDLCs act as "light valves," having binary states of "on" and "off." A PDLC can be made to cooperate with the controllable CLC and the circular polarizer to provide an LCD that can operate in either a mono-color reflective mode or a black-and-white transmissive mode. In a related embodiment of the present invention, the LCD further comprises a color filter, located proximate the controllable CLC, that causes the light to be a certain color when the LCD operates in the transmissive mode. In yet another related embodiment of the present invention, the color filter is a multicolor filter, the light being multicolored when the LCD operates in the transmissive mode. The LCD may therefore be adapted to operate in a multi-color transmissive mode with the addition of the multi-color filter.

In one embodiment of the present invention, the controllable CLC contains a twist agent that determines an intrinsic wavelength of the controllable CLC. The intrinsic wavelength may be within the infra-red ("invisible") or color ("visible") light spectrum; a CLC having an intrinsic wavelength in the infra-red spectrum being particularly useful in transmissive mode displays where the reflection of color to an observer is not desired. Those skilled in the art are familiar with twist agents and their use in CLCs. The present invention can, but is not required to, operate with one or more twist agents in the CLC.

In one embodiment of the present invention, the LCD further comprises a drive circuit that provides a drive signal to selectively place the controllable CLC in the "on" state and the "off" state. The drive circuit, while necessary to change states in the controllable CLC, is not necessary to the present invention, inasmuch as the controllable CLC is multi-stable and therefore able to maintain its state in the absence of the drive signal. The drive circuit may be of any suitable conventional or later-discovered type.

In one embodiment of the present invention, the controllable CLC is arranged in pixels, each of the pixels independently controllable to achieve the "on" and "off" states. This allows the LCD to be driven to display visual patterns to a user.

In one embodiment of the present invention, the first and second substrates contain a conductive matrix that provides a path for a drive voltage to be conveyed to the controllable CLC. The conductive path may be composed of indium tin oxide ("ITO") or any conventional or later-discovered material. In one embodiment of the present invention, the conductive matrix defines pixel locations of the controllable CLC.

In one embodiment of the present invention, the first and second substrates are substantially parallel. Alternatively, the first and second substrates may not be parallel, yielding an LCD of varying thickness.

In one embodiment of the present invention, the predetermined handedness of the controllable CLC is right-handed. Alternatively, the predetermined handedness is left-handed.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which:

FIG. 8-B illustrates a dual-mode CLC display, employing the principles of the present invention, operated in a back-lit color mode.

DETAILED DESCRIPTION

Figure 1:
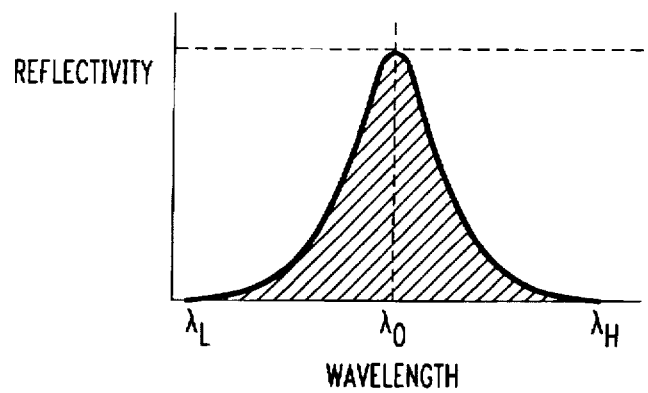
FIG. 1 illustrates the intrinsic reflection/transmission characteristic of a CLC.

Referring first to FIG. 1, illustrated is the intrinsic reflection/transmission characteristic of a cholesteric LC ("CLC") in the "on" state (i.e. planar structure). When a CLC in the "on" state is illuminated with ambient light, the CLC reflects light that has the same handedness as the CLC and that is within an intrinsic spectral bandwidth centered about a wavelength $\lambda_o$; all other wavelengths of incident light, and light of opposite polarity, is transmitted through the CLC. The wavelength $\lambda_o$ may be within the infra-red ("invisible") or color ("visible") light spectrum; a CLC having an intrinsic wavelength in the infra-red spectrum being particularly useful in transmissive mode displays where the reflection of color to an observer is not desired or necessary. By varying the proportion of chiral compound present in the CLC, this selective reflection can be achieved for any wavelength $\lambda_o$ within the infra-red and color spectrums. When the CLC is in the "off" state (i.e. focal-conic structure), the CLC optically scatters all wavelengths of incident light; a substantial portion of the incident light being forward-scattered and a lesser portion being back-scattered, causing a CLC to appear milky-white.

As described with reference to the exemplary embodiments illustrated in FIGS. 2–8, the present invention discloses the heretofore unrecognized improvements in the display quality of CLCs that may be realized by combining conventional CLC technology with one or more circular-polarizing elements. The exemplary embodiments specifically disclosed herein include novel front-lit ("reflective" mode), back-lit ("transmissive" mode), and projection displays characterized in part by enhanced contrast ratios and wider viewing angles.

Figure 2:
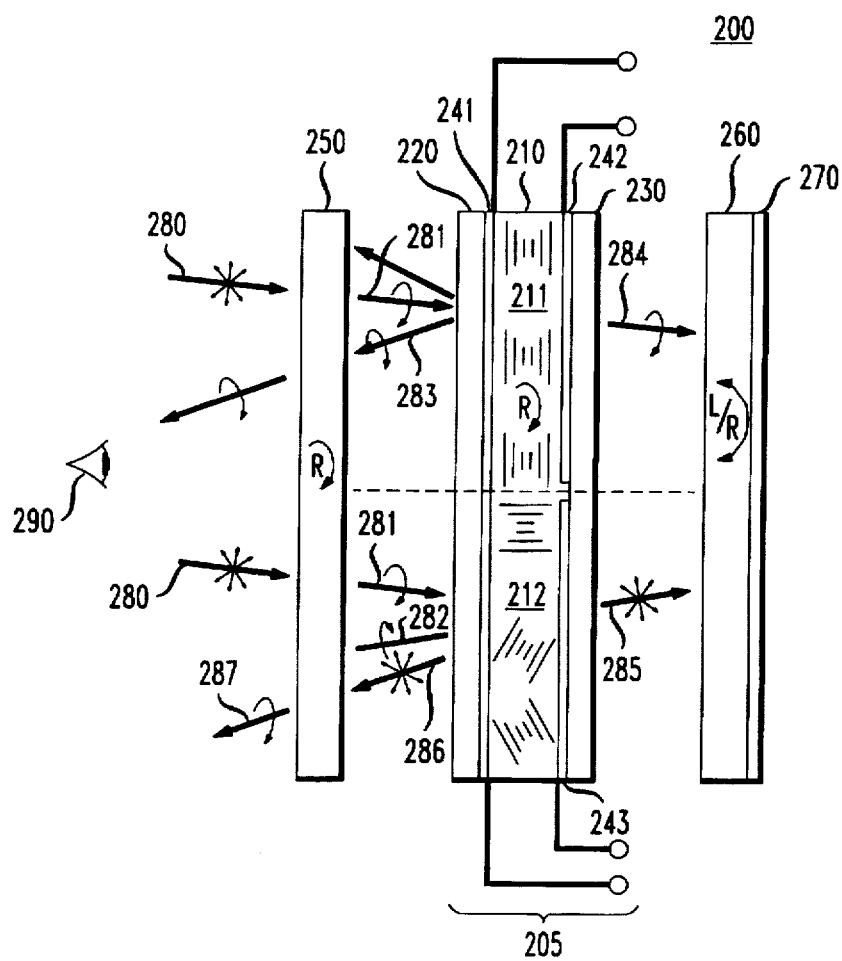
FIG. 2 illustrates a front-lit mono-color CLC display employing the principles of the present invention.

Turning now to FIG. 2, illustrated is a front-lit mono-color CLC display 200 employing the principles of the present invention. The front-lit mono-color CLC display 200 includes a controllable CLC structure 205 that includes a CLC 210 located between first and second substrates 220, 230. The first and second substrates 220, 230 are preferably made from substantially transparent materials and have substantially transparent electrodes 241, 242, 243 associated therewith. The physical arrangement of electrodes 241, 242, 243 as depicted in the FIGS. 2–8 is only for the purposes of illustrating the principles of the present invention, and those skilled in the art will recognize that the principles of the present invention may be employed to advantage in display structures using conventional or novel electrode-matrix configurations. The controllable CLC structure 205—comprised of CLC 210, first and second substrates 220, 230 and electrodes 241, 242, 243—is common to each of the embodiments disclosed in FIGS. 2–8; the various embodiments combining the controllable CLC structure 205 with one or more circular polarizers to enhance the CLC display quality, and other optical components to provide mono-color, black-and-white, and color displays operable in either front-lit, back-lit, or both modes of operation.

The electrodes 241, 242, 243 are coupled to a driving circuit (not shown) that is operative to selectively cause controllable CLC 210 to exhibit an "on" state 211 or an "off" state 212, as heretofore defined. The controllable CLC 210 has a circular polarity of a predetermined handedness (i.e. "right" or "left") when the controllable CLC 210 is in an "on" state 211. When the controllable CLC 210 is in an "off" state 212, it depolarizes the incident light, optically scattering all wavelengths; a substantial portion of the incident light being forward-scattered and a lesser portion being back-scattered.

The front-lit mono-color CLC display 200 also includes a circular polarizer 250, located proximate the first substrate 220, that has a circular polarity of a particular handedness. For the embodiment of the present invention disclosed in FIG. 2, the polarizer 250 is selected to have the same handedness that the controllable CLC 210 has when driven to the "on" state 211. Those skilled in the art will recognize that a circular polarizer transmits the portion of incident light that has the same polarity as the polarizer. Likewise, a polarizer functions as an "analyzer" for the portion of incident light that has the opposite polarity as the polarizer; e.g. a right-handed (or "right-circular") polarizer is a left-handed (or "left-circular") analyzer, which blocks all incident light that is left-circular polarized.

The front-lit mono-color CLC display 200 further includes a second circular polarizer 260, located proximate the second substrate 230 and having an arbitrary handedness, and a reflector 270 located on an opposite side of the second circular polarizer 260 from the second substrate 230. The combination of circular polarizer 260 and reflector 270 provides the same function as conventionally provided by a black coating on the rear surface of a front-lit reflective LC display. The circular polarizer 260 may have either left- or right-circular polarity, regardless of the polarity of polarizer 250 and CLC 210. For example, assume that polarizer 260 has left-circular polarity. Light having right-circular polarity will be absorbed by the polarizer 260, and light having left-circular polarity will be transmitted. The left-circularly-polarized light that is transmitted, however, will become right-circularly polarized upon its reflection at the interface between polarizer 260 and reflector 270; the reflected right-circularly-polarized light will then be absorbed by the left-circular polarizer (i.e. right-circular analyzer) 260. Those skilled in the art will recognize that the same effect may be achieved by using a polarizer 260 that has right-circular polarity. The combination of circular polarizer 260 and reflector 270 (in place of a conventional black, rear-surface coating) is particular advantageous in out-door installations. In many out-door applications, the conventional black rear-surface coating can absorb significant amounts of thermal energy, which can cause the display to over-heat. Because the combination polarizer/reflector may be positioned away from the CLC, heat build-up near the CLC 210 is avoided.

Having described the structure of front-lit monocolor CLC display 200, the operation may now be described such that the principles of the present invention may be fully understood. For purposes of illustration, it is assumed that the CLC 210 is selected such that, when driven to an "on" state 211, incident light having wavelengths within the CLC's intrinsic spectral bandwidth of reflection, and the same handedness as the CLC, is reflected with right-circular polarization; all other wavelengths of incident light, and light of opposite polarity, is transmitted through the CLC. Circular polarizer 250 is also selected to have right-circular polarization. From the description of operation that follows, those skilled in the art will readily appreciate that, alternatively, CLC 210 and polarizer 250 could both have left-circular polarity.

Those skilled in the art recognize that ambient (i.e. "white") light is composed of randomly-polarized light waves and that, theoretically, 50% of the light is right-circularly polarized and 50% is left-circularly polarized. Thus, when front-lit mono-color CLC display 200 is illuminated by incident light 280, the circular polarizer 250 transmits the 50% component 281 of the incident light 280 that is right-circularly polarized. A small portion 282 of the transmitted light 281 may be reflected from the first substrate 220 back towards the circular polarizer 250. The polarity of the transmitted light 281 that is reflected by the first substrate, however, undergoes a reversal in polarity, becoming left-circularly-polarized. The reflected left-circularly-polarized light 282 is then absorbed by the right-circular polarizer 250. Thus, the present invention eliminates an observer's perception of any light reflected from substrate 220.

When the CLC 210 is in an "on" state 211, the light transmitted through polarizer 250 that also passes through the first substrate 220 is either reflected 283 or transmitted 284 by the CLC 210. As previously described, the light reflected by the CLC 210 is that portion of the incident light having wavelengths within the intrinsic spectral bandwidth, and the same handedness, of the CLC 210; the portion having wavelengths outside the intrinsic spectral bandwidth is transmitted through the CLC. The portion 284 that is transmitted through the CLC 210 is absorbed by the combination of circular polarizer 260 and reflector 270. In particular, however, the portion 283 that is reflected by the CLC 210 has the same handedness as the CLC 210 (i.e. right-circular) and will thus pass back through the right-circular polarizer 250, whereby it may be perceived by an observer 290.

When the CLC 210 is in an "off" state 212, the light transmitted through the polarizer 250 that also passes through the first substrate 220 is optically scattered (de-polarized) by the CLC 210; a substantial portion 285 of the incident light 281 being forward-scattered and a lesser portion 286 being back-scattered. The portion 285 of the incident light 281 that is forward-scattered is absorbed by the combination of circular polarizer 260 and reflector 270. Because the scattered light is "depolarized" (i.e. randomly polarized; theoretically 50% left-circular and 50% right-circular), approximately 50% of the back-scattered light 286 will be blocked by the right-circular polarizer (left-circular analyzer) 250. Thus, for the region of the front-lit mono-color CLC display 200 that is in an "off" state 212, a substantial portion of the incident light 280 is not perceived by an observer 290; the resulting CLC display 200 thereby exhibiting a contrast ratio substantially improved over that of conventional CLC displays.

Figure 3:
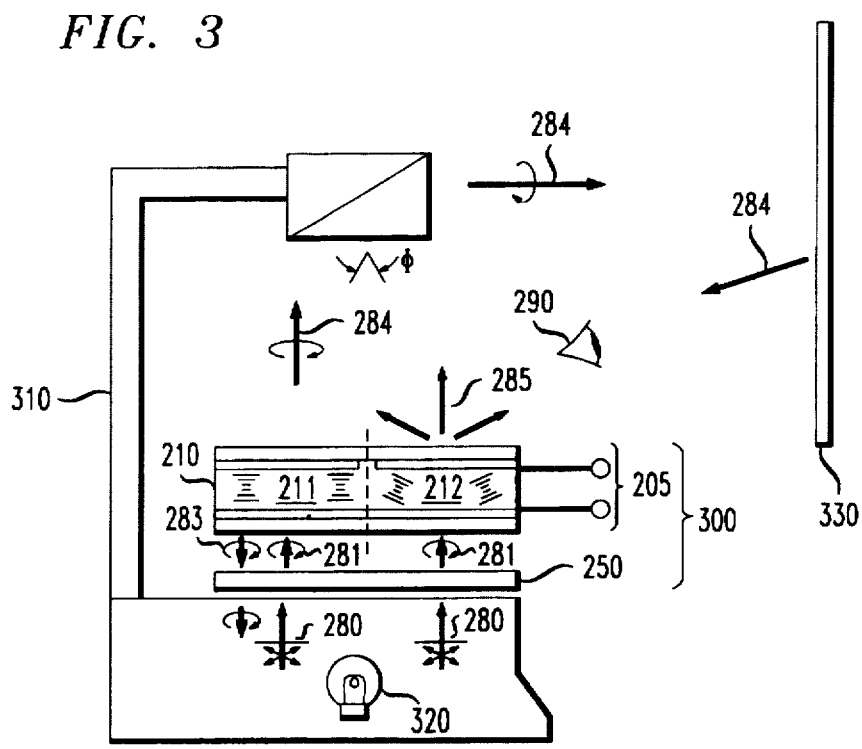
FIG. 3 illustrates a mono-color CLC projection display employing the principles of the present invention.

Turning now to FIG. 3, illustrated is a mono-color CLC projection display 300 employing the principles of the present invention. Those skilled in the art are familiar with the use of projection displays with an overhead projector 310 to project an image on a screen 330 such that the projected image is perceptible to an observer 290. Monocolor CLC projection display 300 includes controllable CLC structure 205 and a circular polarizer 250 that is located proximate to the controllable CLC structure 205 and which has a circular polarity of the same handedness that the CLC 210 has when driven to the "on" state 211.

For purposes of illustration, it is assumed that the CLC 210 is selected such that, when driven to an "on" state 211, incident light having wavelengths within the CLC's intrinsic spectral bandwidth of reflection, and same handedness, is reflected with right-circular polarization; all other wavelengths of incident light, and light of opposite polarity, is transmitted through the CLC. Circular polarizer 250 is also selected to have right-circular polarization. From the description of operation that follows, those skilled in the art will readily appreciate that, alternatively, CLC 210 and polarizer 250 could both have left-circular polarity.

The operation of the mono-color CLC projection display 300 is similar to that of the front-lit CLC display 200; the difference being that the image perceived by an observer 290 is produced by the light transmitted through the display, rather than reflected therefrom. The mono-color CLC projection display 300 is preferably illuminated by a light source 320 that produces unpolarized "white" light. Thus, when the mono-color CLC projection display 300 is illuminated by incident light 280, the circular polarizer 250 transmits the 50% component 281 of the incident light 280 that is right-circularly polarized.

When the CLC 210 is in an "on" state 211, the light transmitted through polarizer 250 is either reflected 283 or transmitted 284 by the CLC 210. As previously described, the light reflected by the CLC 210 is that portion of the incident light having wavelengths within the intrinsic spectral bandwidth, and same handedness, of the CLC 210; all other wavelengths of incident light, and light of opposite polarity, is transmitted through the CLC. Thus, the mono-color CLC projection display 300 functions as a "subtractive" display; i.e. the light 284 that is transmitted through the mono-color CLC projection display 300 is the complement of the intrinsic color of CLC 210. The transmitted light 284 is projected by overhead projector 310 onto screen 330 where it is perceived by an observer 290.

When the CLC 210 is in an "off" state 212, the light transmitted through the polarizer 250 is optically scattered (de-polarized) by the CLC 210; a portion 285 of the incident light 281 being forward-scattered. The portion 285 of the incident light 281 that is forward-scattered is emitted from the controllable CLC structure 205 at substantially all angles. The collection angle φ of the overhead projector 310, however, is generally narrow, resulting in only an insubstantial portion of the forward-scattered light 285 being projected onto the screen 330. Thus, for the region of the mono-color CLC projection display 300 that is in an "off" state 212, a substantial portion of the incident light 281 is not perceived by an observer 290; i.e. the regions of the mono-color CLC projection display 300 that are in an "off" state 212 appear substantially black to an observer 290, thus yielding a display with a high contrast ratio.

Figure 4:
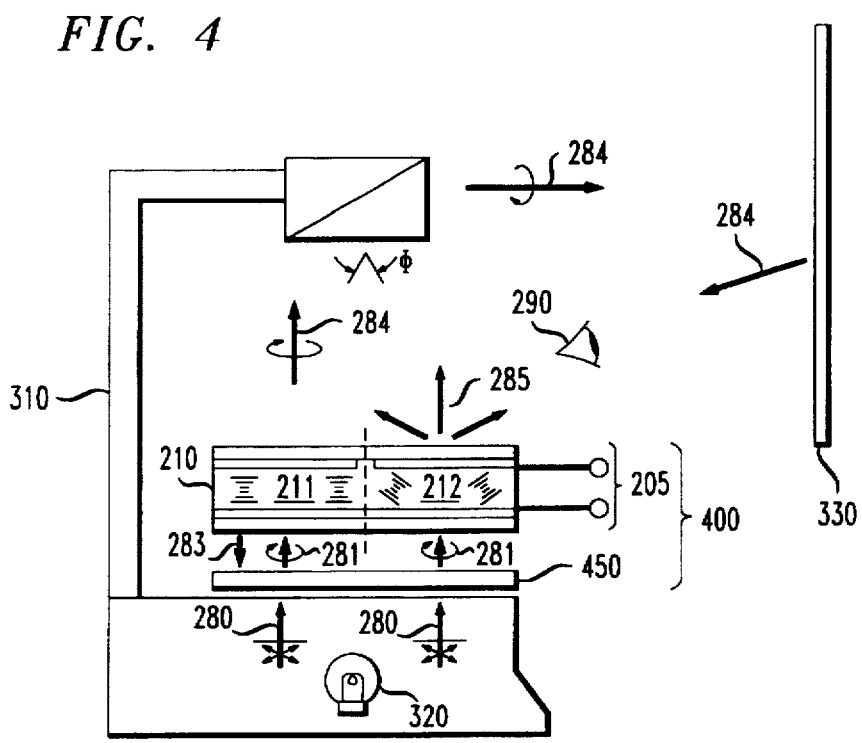
FIG. 4 illustrates a black-and-white CLC projection display employing the principles of the present invention.

Turning now to FIG. 4, illustrated is a black-and-white CLC projection display 400 employing the principles of the present invention. The black-and-white CLC projection display 400 includes controllable CLC structure 205 and a circular polarizer 450 that is located proximate to the controllable CLC structure 205 and which has a circular polarity opposite to that of the CLC 210 (when CLC 210 is driven to the "on" state 211).

For purposes of illustration. it is assumed that the CLC 210 is selected such that, when driven to an "on" state 211, incident light having wavelengths within the CLC's intrinsic spectral bandwidth of reflection, and the same handedness as the CLC. is reflected with right-circular polarization; all other wavelengths of incident light, and light of opposite polarity, is transmitted through the CLC. Circular polarizer 450 is selected to have left-circular polarization. From the description of operation that follows, those skilled in the art will readily appreciate that, alternatively, CLC 210 could be left handed and polarizer 450 could be right-handed.

The operation of the black-and-white CLC projection display 400 is similar to that of the front-lit CLC display 200; the difference being that the image perceived by an observer 290 is produced by the light transmitted through the display, rather than reflected therefrom. The black-and-white CLC projection display 400 is preferably illuminated by a light source 320 that produces unpolarized "white" light. Thus, when the black-and-white CLC projection display 400 is illuminated by incident light 280, the circular polarizer 250 transmits the 50% component 281 of the incident light 280 that is left-circularly polarized.

When the CLC 210 is in an "on" state 211, the light 281 transmitted through polarizer 250 is either reflected 283 or transmitted 284 by the CLC 210. As previously described, the light reflected by the CLC 210 is that portion of the incident light having wavelengths within the intrinsic spectral bandwidth, and the same handedness, of the CLC 210; all other wavelengths of incident light, and light of opposite polarity, is transmitted through the CLC. Because all of the light 281 incident on the right-handed CLC is left-handed, all of the light 281 is transmitted through the CLC 210. The circular-polarizer 450 thus prevents the CLC 210, when in the "on" state 211, from reflecting any of the light 281; thereby resulting in the transmitted light 284 being substantially "white." The transmitted light 284 is projected by overhead projector 310 onto screen 330 where it is perceived by an observer 290.

When the CLC 210 is in an "off" state 212, the light 281 transmitted through the polarizer 250 is optically scattered (de-polarized) by the CLC 210; a portion 285 of the incident light 281 being forward-scattered. The portion 285 of the incident light 281 that is forward-scattered is emitted from the controllable CLC structure 205 at substantially all angles. The collection angle α of the overhead projector 310, however, is generally narrow, resulting in only an insubstantial portion of the forward-scatttered light 285 being projected onto the screen 330. Thus, for the region of the black-and-white CLC projection display 400 that is in an "off" state 212, a substantial portion of the incident light 281 is not perceived by an observer 290; i.e. the regions of the black-and-white CLC projection display 400 that are in an "off" state 212 appear substantially black to an observer 290; thus yielding a display with a high contrast ratio.

Figure 5:
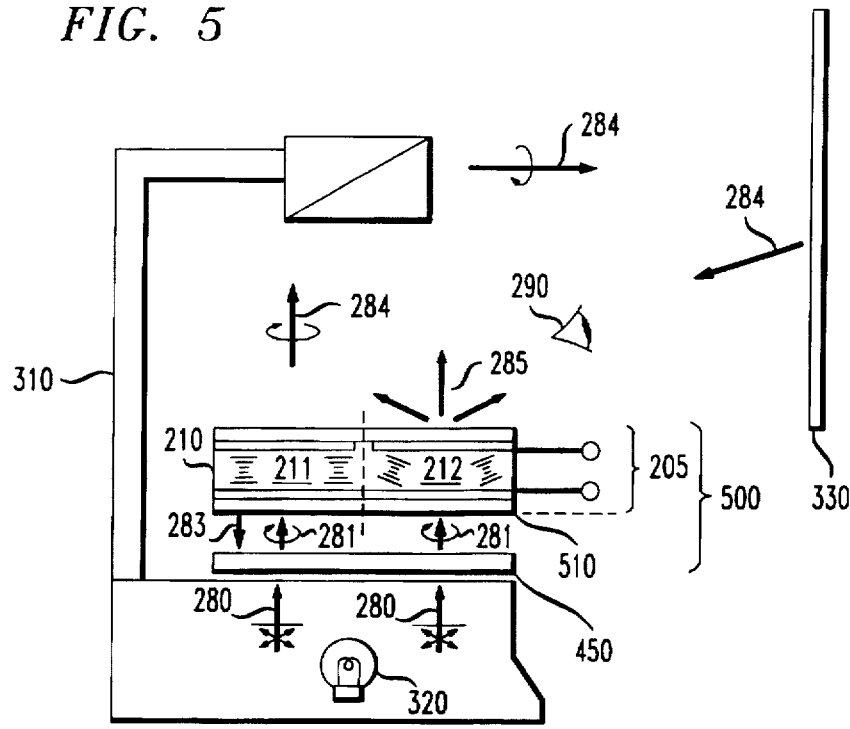
FIG. 5 illustrates a color CLC projection display employing the principles of the present invention.

Turning now to FIG. 5, illustrated is a color CLC projection display 500 employing the principles of the present invention. The color CLC projection display 500 includes controllable CLC structure 205 and a circular polarizer 450 that is located proximate to the controllable CLC structure 205 and which has a circular polarity opposite to that that the CLC 210 has when driven to the "on" state 211. The display 500 further includes a color filter 510 that is located proximate to the controllable CLC structure 205. Those skilled in the art are familiar with the properties of color filters. The color filter 510 may be of uniform color or, in a preferred embodiment, may be multicolored; i.e. the color filter 510 may be a pattern of red, green and blue ("RGB") regions corresponding to individual cells of the controllable CLC structure 205, whereby a full-color display can be realized. Other color filters are within the broad scope of the present invention, including yellow, cyan and magenta ("YCM"). The operation of the color CLC projection display 500 is identical to that of the black-and-white CLC projection display 400; the only difference being that the addition of the color filter 510 provides the capability to project color images.

Figure 6:
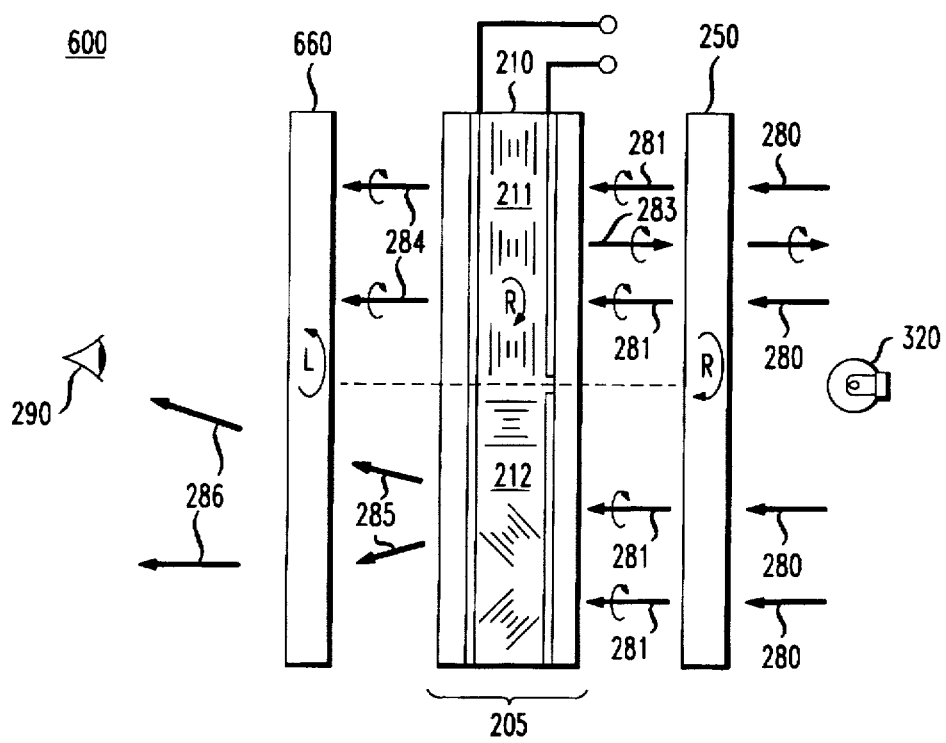
FIG. 6 illustrates a black-and-white back-lit CLC display employing the principles of the present invention.

Turning now to FIG. 6, illustrated is a black-and-white back-lit CLC display 600 employing the principles of the present invention. The black-and-white back-lit CLC display 600 includes controllable CLC structure 205, a first circular polarizer 250 that is located proximate to a first substrate of controllable CLC structure 205 and which has a circular polarity of the same handedness that the CLC 210 has when driven to the "on" state 211, a second circular polarizer 660 that is located proximate to a second substrate of the controllable CLC structure 205 and which has a circular polarity opposite to the handedness that the CLC 210 has when driven to the "on" state 211, and a light source 320.

For purposes of illustration, it is assumed that the CLC 210 is selected such that, when driven to an "on" state 211, incident light having wavelengths within the CLC's intrinsic spectral bandwidth of reflection, and the same handedness as CLC 210, is reflected with right-circular polarization; all other wavelengths of incident light, and light of opposite polarity, is transmitted through the CLC. Circular polarizer 250 is also selected to have right-circular polarization. Therefore, the second circular polarizer must have left-circular polarization. From the description of operation that follows, those skilled in the art will readily appreciate that, alternatively, CLC 210 and polarizer 250 could both have left-circular polarity and circular polarizer 660 could have right-circular polarity.

The black-and-white back-lit CLC display 600 is preferably illuminated by a light source 320 that produces unpolarized "white" light. Thus, when the black-and-white back-lit CLC display 600 is illuminated by incident light 280, the circular polarizer 250 transmits the 50% component 281 of the incident light 280 that is right-circularly polarized.

When the CLC 210 is in an "on" state 211, the light transmitted through polarizer 250 is either reflected 283 or transmitted 284 by the CLC 210. As previously described, the light reflected by the CLC 210 is that portion of the incident light having wavelengths within the intrinsic spectral bandwidth, and the same handedness, of the CLC 210; all other wavelengths of incident light, and light of opposite polarity, is transmitted through the CLC. The light 284 that is transmitted through the CLC 210 is the complement of the intrinsic color of CLC 210. The transmitted light 284 has right-circular polarization, however, and is thus blocked by left-circular polarizer (right-circular analyzer) 660. Therefore, when a cell of the CLC 210 is in the "on" state, the observer 290 will perceive that region of the display to be substantially black.

When the CLC 210 is in an "off" state 212, the light transmitted through the polarizer 250 is optically scattered (de-polarized) by the CLC 210; a substantial portion 285 of the incident light 281 being forward-scattered. The portion 285 of the incident light 281 that is forward-scattered is emitted from the controllable CLC structure 205 as depolarized (i.e. randomly polarized) light. The portion 286 of the forward-scattered light 285 that is left-circularly polarized is transmitted through the left-circular polarizer 660. Thus, for the region of the black-and-white back-lit CLC display 600 that is in an "off" state 212, a portion of the incident light 281 is perceived by an observer 290; i.e. the regions of the black-and-white back-lit CLC display 600 that are in an "off" state 212 appear substantially white to an observer 290.

Figure 7:
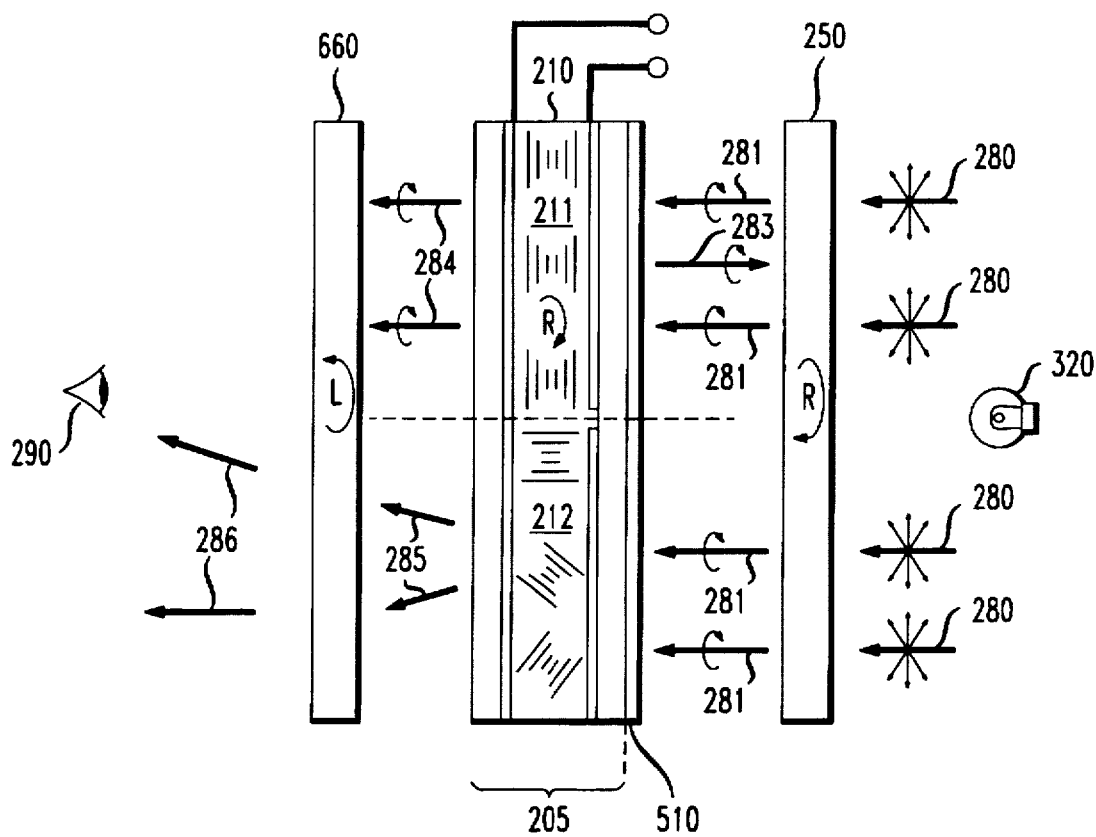
FIG. 7 illustrates a color back-lit CLC display employing the principles of the present invention.

Turning now to FIG. 7, illustrated is a color back-lit CLC display 700 employing the principles of the present invention. The color back-lit CLC display 700 includes controllable CLC structure 205, a first circular polarizer 250 that is located proximate to a first substrate of controllable CLC structure 205 and which has a circular polarity of the same handedness that the CLC 210 has when driven to the "on" state 211, a second circular polarizer 660 that is located proximate to a second substrate of the controllable CLC structure 205 and which has a circular polarity opposite to the handedness that the CLC 210 has when driven to the "on" state 211, and a light source 320. The display 700 further includes a color filter 510 that is located proximate to the controllable CLC structure 205. Those skilled in the art are familiar with the properties of color filters. The color filter 510 may be of uniform color or, in a preferred embodiment, may be multicolored; i.e. the color filter 510 may be a pattern of red, green and blue ("RGB") regions corresponding to individual cells of the controllable CLC structure 205, whereby a full-color display can be realized. Other color filters are within the broad scope of the present invention, including yellow, cyan and magenta ("YCM"). The operation of the color back-lit CLC display 700 is identical to that of the black-and-white back-lit CLC display 600; the only difference being that the addition of the color filter 510 provides the capability to display color images to an observer 290.

Figure 8A:
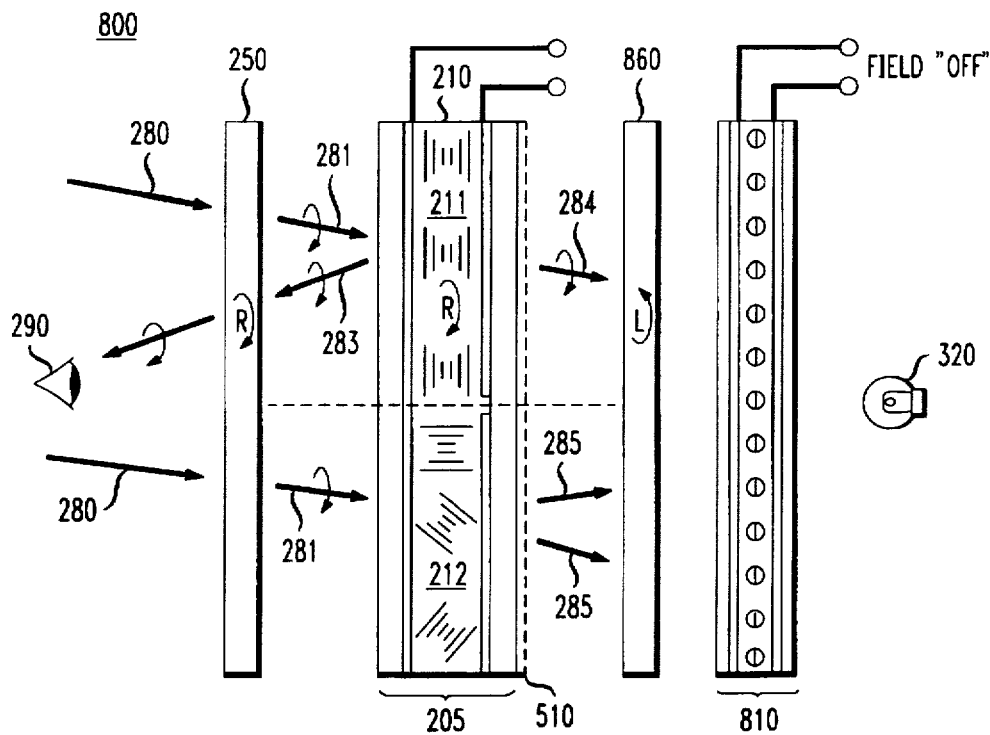
FIG. 8-A illustrates a dual-mode CLC display, employing the principles of the present invention, operated in a front-lit mono-color mode.
Figure 8B:
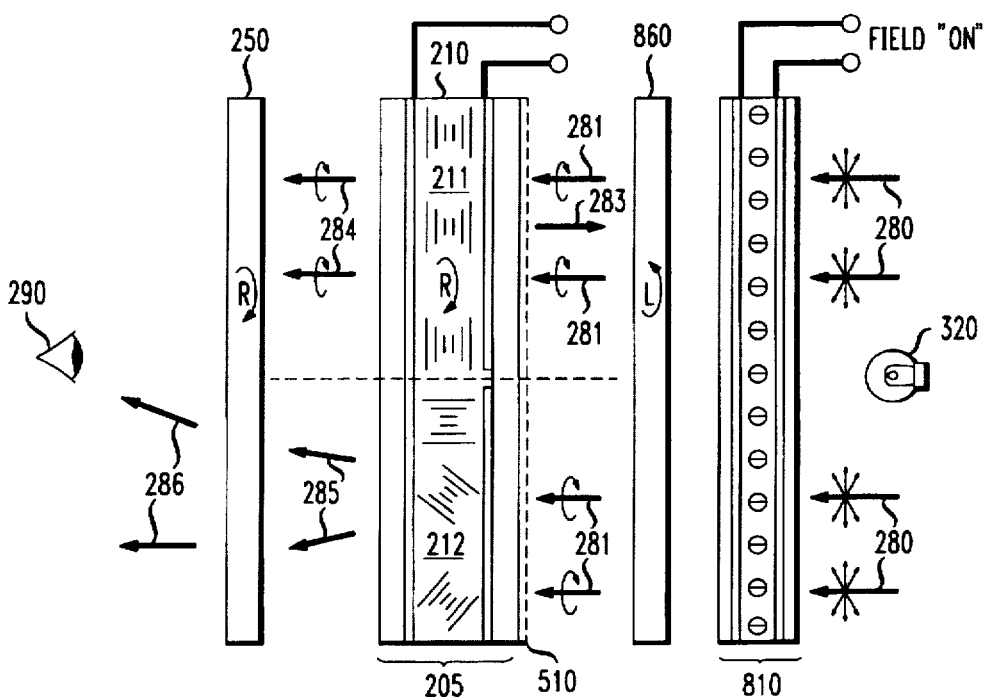

Turning now to FIGS. 8-A and 8-B, illustrated is a dual-mode CLC display 800, employing the principles of the present invention, when operated in front-lit and back-lit modes, respectively. The dual-mode CLC display 800 includes a controllable CLC structure 205; a first circular polarizer 250 located proximate a first surface of the controllable CLC structure 205 and having a circular polarity of the same handedness that the controllable CLC 210 has when driven to the "on" state 211; a second circular polarizer 860 located proximate a second surface of the controllable CLC structure 205 and having a circular polarity of the opposite handedness that the controllable CLC 210 has when driven to the "on" state 211; a polymer-dispersed liquid crystal ("PDLC") structure 810 located on an opposite side of the second circular polarizer 860 from the color filter 510; and a light source 320.

Those skilled in the art are familiar with the operational characteristics of conventional PDLC structures. A PDLC is suitably operative as a "light valve;" the PDLC 810 exhibiting substantial opacity when driven to an "off" state and substantial transparency when driven to an "on" state. Thus, the dual-mode CLC display 800 may be operated in a front-lit mode by disabling light source 320 and driving the PDLC 810 to the "off" (opaque) state, and in a back-lit mode by enabling light source 320 and driving the PDLC 810 to the "on" (transparent) state.

When it is desired to operate the dual-mode CLC display 800 in a front-lit mode, as shown in FIG. 8-A, the combination of the PDLC structure 810 and the circular polarizer 860 provides the same function as a black coating on the rear surface of a conventional front-lit reflective CLC display. Thus, as those skilled in the art will recognize, the operation of the dual-mode CLC display 800 in the front-lit mode is identical to the operation of the front-lit mono-color CLC display 200 illustrated in FIG. 2.

When it is desired to operate the dual-mode CLC display 800 in a back-lit mode, as shown in FIG. 8-B, the PDLC may be driven to an "on" (i.e. transparent) state whereby light source 320 can provide suitable back-lighting. The operation of the dual-mode CLC display 800 in the back-lit mode is similar to the operation of the black-and-white back-lit CLC display 600 illustrated in FIG. 6. For purposes of illustration, it is assumed that the CLC 210 is selected such that, when driven to an "on" state 211, incident light having wavelengths within the CLC's intrinsic spectral bandwidth of reflection, and same handedness, is reflected with right-circular polarization; all other wavelengths of incident light, and light of opposite polarity, is transmitted through the CLC. Circular polarizer 860 is selected to have left-circular polarization, and circular polarizer 250 is selected to have right-circular polarization. From the description of operation that follows, those skilled in the art will readily appreciate that, alternatively, CLC 210 and polarizer 250 could both have left-circular polarity and circular polarizer 860 could have right-circular polarity.

The dual-mode CLC display 800, when operated in a back-lit mode, is preferably illuminated by a light source 320 that produces unpolarized "white" light. Thus, when the PDLC 810 is in the "on" (transparent) state, the circular polarizer 860 transmits the 50% component 281 of the incident light 280 that is left-circularly polarized.

When the CLC 210 is in an "on" state 211, the light transmitted through polarizer 860 is either reflected 283 or transmitted 284 by the CLC 210. As previously described, the light reflected by the CLC 210 is that portion of the incident light having wavelengths within the intrinsic spectral bandwidth, and the same handedness, of the CLC 210; all other wavelengths of incident light, and light of opposite polarity, is transmitted through the CLC. The transmitted light 284 has left-circular polarization, however, and is thus blocked by right-circular polarizer (left-circular analyzer) 250. Therefore, when a cell of the CLC 210 is in the "on" state, the observer 290 will perceive that region of the display to be substantially black.

When the CLC 210 is in an "off" state 212, the light transmitted through the polarizer 860 is optically scattered (de-polarized) by the CLC 210; a substantial portion 285 of the incident light 281 being forward-scattered. The portion 285 of the incident light 281 that is forward-scattered is emitted from the controllable CLC structure 205 as depolarized (i.e. randomly polarized) light. The portion 286 of the forward-scattered light 285 that is right-circularly polarized is transmitted through the right-circular polarizer 660. Thus, for the region of the dual-mode CLC display 800 that is in an "off" state 212, a portion of the incident light 281 is perceived by an observer 290; i.e. the regions of the dual-mode CLC display 800 that are in an "off" state 212 appear substantially white to an observer 290. Therefore, the dual-mode CLC display 800 can provide a dual-mode CLC display capable of both front-lit mono-color and back-lit black-and-white modes of operation.

The dual-mode CLC display 800 may further include a color filter 510 located proximate a second surface of the controllable CLC structure 205. Those skilled in the art will recognize that the presence of color filter 510 will have no effect on the image perceived by an observer 290 when dual-mode CLC display 800 is operated in the front-lit mode; i.e. an observer 290 will only perceive a mono-color display. When operated in the back-lit mode, however, the addition of the color filter 510 provides the capability to display color images to an observer 290 (as described supra with reference to FIGS. 6, 7). Therefore, a dual-mode CLC display 800 having a color filter 510 can provide a dual-mode CLC display capable of both front-lit mono-color and back-lit full-color modes of operation.

From the above, it is apparent that the present invention provides a cholesteric LCD and methods of operating and manufacturing the LCD. The LCD includes: (1) a controllable CLC located between first and second substrates and having a circular polarity of a predetermined handedness when the controllable LC is in an "on" state and (2) a circular polarizer, located proximate the first substrate and having a circular polarity of a particular handedness, that circularly polarizes light passing therethrough and incident on the controllable LC and functions as an analyzer of an opposite handedness for light reflected from the controllable LC to attenuate a substantial portion of the light when the controllable LC is in an "off" state and to attenuate an insubstantial portion of the light when the controllable LC is in the "on" state and the predetermined handedness equals the particular handedness.

Although the present invention and its advantages have been described in detail, those skilled in the art should understand that they can make various changes, substitutions and alterations herein without departing from the spirit and scope of the invention in its broadest form. In particular, although the circular polarizers and other display elements may be illustrated as spatially-separated from the controllable CLC structure 205, those skilled in the art will recognize that, in suitable applications, the elements may be positioned in direct contact.

What is claimed is:

1. A cholesteric liquid crystal display (LCD), comprising:
   a controllable cholesteric liquid crystal (CLC) located between first and second substrates, said controllable CLC selectively exhibiting an "on" state and an "off" state and having a circular polarity of a predetermined handedness when said controllable CLC is in said "on" state; and
   a circular polarizer, located proximate said first substrate and having a circular polarity of a particular handedness, that cooperates with said controllable CLC to increase the difference between the relative brightness of said "on" state and said "off" state, whereby a contrast ratio of said cholesteric LCD is increased.

2. The LCD as recited in claim 1 wherein said circular polarizer attenuates a substantial portion of light reflected from said first substrate.

3. The LCD as recited in claim 1 further comprising:
   a second circular polarizer, located proximate said second substrate and having an arbitrary handedness; and
   a reflector located on an opposite side of said second circular polarizer from said second substrate, said second circular polarizer and said reflector cooperating to absorb light transmitted through said controllable CLC.

4. The LCD as recited in claim 1 wherein said predetermined handedness equals said particular handedness, said controllable CLC reflecting wavelengths of light corresponding to an intrinsic color of said controllable CLC and transmitting all other wavelengths of light when said controllable CLC is in said "on" state, said LCD thereby adapted to cooperate with a projector to project said all other wavelengths of light when said controllable CLC is in said "on" state, said LCD scattering all wavelengths of light when said controllable CLC is in said "off" state.

5. The LCD as recited in claim 1 wherein said predetermined handedness is opposite said particular handedness, said LCD thereby adapted to cooperate with a projector to project white light when said controllable CLC is in said "on" state, said LCD scattering said light when said controllable CLC is in said "off" state.

6. The LCD as recited in claim 5 further comprising a color filter proximate said controllable CLC, said color filter causing said LCD to cooperate with said projector to project a colored light when said controllable CLC is in said "on" state, said LCD scattering said colored light when said controllable CLC is in said "off" state.

7. The LCD as recited in claim 6 wherein said color filter is a multicolor filter, said multicolor filter causing said LCD to cooperate with said projector to project a multicolored light when said controllable CLC is in said "on" state, said LCD scattering said colored light when said controllable CLC is in said "off" state.

8. The LCD as recited in claim 1 further comprising a second circular polarizer located proximate said second substrate of said controllable CLC and having a handedness that is opposite said predetermined handedness and said particular handedness, said second circular polarizer thereby blocking light transmitted through said controllable CLC when said controllable CLC is in said "on" state.

9. The LCD as recited in claim 8 further comprising a color filter proximate said controllable CLC, said color filter causing said LCD to transmit a colored light when said controllable CLC is in said "off" state.

10. The LCD as recited in claim 9 wherein said color filter is a multicolor filter, said color filter causing said LCD to transmit a multicolored light when said controllable CLC is in said "off" state.

11. The LCD as recited in claim 1 further comprising a polymer dispersed LC (PDLC), located between third and fourth substrates and on an opposite side of said second substrate from said controllable CLC, that allows said LCD to operate:
   in a reflective mode wherein said PDLC is placed in an opaque state, and
   in a transmissive mode wherein said PDLC is placed in a transparent state and light passing through said PDLC and said controllable CLC passes through said circular polarizer.

12. The LCD as recited in claim 11 further comprising a color filter, located proximate said second substrate, that causes said light to be a certain color when said LCD operates in said transmissive mode.

13. The LCD as recited in claim 12 wherein said color filter is a multicolor filter, said light being multicolored when said LCD operates in said transmissive mode.

14. The LCD as recited in claim 1 wherein said controllable CLC contains a twist agent that determines an intrinsic color of said controllable CLC.

15. The LCD as recited in claim 1 further comprising a drive circuit that provides a drive signal to selectively drive said controllable CLC to said "on" and said "off" states.

16. The LCD as recited in claim 1 wherein said controllable CLC is arranged in pixels, each of said pixels independently controllable to achieve said "on" and said "off" states.

17. The LCD as recited in claim 1 wherein said first and second substrates contain a conductive matrix that provides a path for drive voltage to be conveyed to said controllable CLC.

18. The LCD as recited in claim 17 wherein said conductive matrix defines pixel locations of said controllable CLC.

19. The LCD as recited in claim 1 wherein said first and second substrates are substantially parallel.

20. The LCD as recited in claim 1 wherein said predetermined handedness is right-handed.

21. A method of operating a cholesteric liquid crystal display (LCD), comprising the steps of:

controlling a controllable cholesteric liquid crystal (CLC) located between first and second substrates, said controllable CLC selectively exhibiting an "on" state and an "off" state and having a circular polarity of a predetermined handedness when said controllable CLC is in said "on" state; and circularly polarizing light passing through a circular polarizer and incident on said controllable CLC, said circular polarizer located proximate said first substrate and having a circular polarity of a particular handedness, said circular polarizer cooperating with said controllable CLC to increase the difference between the relative brightness of said "on" state and said "off" state, whereby a contrast ratio of said cholesteric LCD is increased.

22. The method as recited in claim 21 further comprising the step of attenuating a substantial portion of light reflected from said first substrate with said circular polarizer.

23. The method as recited in claim 21 further comprising the steps of:

passing said light through a second circular polarizer located on an opposite side of said second substrate from said controllable CLC and having an arbitrary handedness; and reflecting said light from a reflector located on an opposite side of said second circular polarizer from said second substrate, said second circular polarizer and said reflector cooperating to absorb light transmitted through said controllable CLC.

24. The method as recited in claim 21 wherein said predetermined handedness equals said particular handedness, said controllable CLC reflecting wavelengths of light corresponding to an intrinsic color of said controllable CLC and transmitting all other wavelengths of light when said controllable CLC is in said "on" state, said LCD adapted to cooperate with a projector, said method comprising the steps of:

projecting light of said all other wavelengths when said controllable CLC is in said "on" state; and scattering all wavelengths of light when said controllable CLC is in said "off" state.

25. The method as recited in claim 21 wherein said predetermined handedness is opposite said particular handedness, said LCD adapted to cooperate with a projector to project white light when said controllable CLC is in said "on" state, said method comprising the step of scattering said light with said LCD when said controllable CLC is in said "off" state.

26. The method as recited in claim 25 further comprising the step of passing said light through a color filter proximate said controllable CLC, said color filter causing said LCD to cooperate with said projector to project a colored light when said controllable CLC is in said "on" state, said LCD scattering said colored light when said controllable CLC is in said "off" state.

27. The method as recited in claim 26 wherein said color filter is a multicolor filter, said multicolor filter causing said LCD to cooperate with said projector to project a multicolored light when said controllable CLC is in said "on" state, said LCD scattering said colored light when said controllable CLC is in said "off" state.

28. The method as recited in claim 21 further comprising the step of providing a second circular polarizer located on an opposite side of said second substrate from said controllable CLC and having a handedness that is opposite said predetermined handedness and said particular handedness, said second circular polarizer thereby blocking light transmitted through said controllable CLC when said controllable CLC is in said "on" state.

29. The method as recited in claim 28 further comprising the step of passing said light through a color filter proximate said controllable CLC, said color filter causing said LCD to transmit a colored light when said controllable CLC is in said "off" state.

30. The method as recited in claim 29 wherein said color filter is a multicolor filter, said color filter causing said LCD to transmit a multicolored light when said controllable CLC is in said "off" state.

31. The method as recited in claim 21 further comprising the step of providing a polymer dispersed LC (PDLC) on an opposite side of said second substrate from said controllable CLC, said PDLC allowing said LCD to operate:

in a reflective mode wherein said PDLC is placed in an opaque state, and in a transmissive mode wherein said PDLC is placed in a transparent state and light passing through said PDLC and said controllable CLC passes through said circular polarizer.

32. The method as recited in claim 31 further comprising the step of passing said light through a color filter, located proximate said second substrate, that causes said light to be a certain color when said LCD operates in said transmissive mode.

33. The method as recited in claim 32 wherein said color filter is a multicolor filter, said light being multicolored when said LCD operates in said transmissive mode.

34. The method as recited in claim 21 wherein said controllable CLC contains a twist agent that determines an intrinsic color of said controllable CLC.

35. The method as recited in claim 21 wherein said step of controlling comprises the step of providing a drive signal from a drive circuit to selectively place said controllable CLC in said "on" and said "off" states.

36. The method as recited in claim 21 wherein said controllable CLC is arranged in pixels, said step of controlling comprising the step of controlling each of said pixels independently to achieve said "on" and "off" states.

37. The method as recited in claim 21 wherein said first and second substrates contain a conductive matrix that provides a path for drive voltage to be conveyed to said controllable CLC.

38. The method as recited in claim 37 wherein said conductive matrix defines pixel locations of said controllable CLC.

39. The method as recited in claim 21 wherein said first and second substrates are substantially parallel.

40. The method as recited in claim 21 wherein said predetermined handedness is right-handed.

41. A method of manufacturing a cholesteric liquid crystal display (LCD), comprising the steps of:

locating a controllable cholesteric liquid crystal (CLC) between first and second substrates, said controllable CLC capable of selectively exhibiting an "on" state and an "off" state and having a circular polarity of a predetermined handedness when said controllable CLC is in said "on" state; and locating a circular polarizer having a circular polarity of a particular handedness proximate said first substrate, said circular polarizer capable of cooperating with said controllable CLC to increase the difference between the relative brightness of said "on" state and said "off" state whereby a contrast ratio of said cholesteric LCD is increased.

42. The method as recited in claim 41 wherein said circular polarizer attenuates a substantial portion of light reflected from said first substrate.

43. The method as recited in claim 41 further comprising the steps of:

locating a second circular polarizer on an opposite side of said second substrate from said controllable CLC, said second circular polarizer having an arbitrary handedness; and locating a reflector on an opposite side of said second circular polarizer from said second substrate, said second circular polarizer and said reflector cooperating to absorb light transmitted through said controllable CLC.

44. The method as recited in claim 41 wherein said predetermined handedness equals said particular handedness, said controllable CLC reflecting wavelengths of light corresponding to an intrinsic color of said controllable CLC and transmitting all other wavelengths of light when said controllable CLC is in said "on" state, said LCD adapted to cooperate with a projector to project said all other wavelengths of light when said controllable CLC is in said "on" state, said LCD scattering said light when said controllable CLC is in said "off" state.

45. The method as recited in claim 41 wherein said predetermined handedness is opposite said particular handedness, said LCD adapted to cooperate with a projector to project white light when said controllable CLC is in said "on" state, said LCD scattering said light when said controllable CLC is in said "off" state.

46. The method as recited in claim 45 further comprising the step of locating a color filter proximate said controllable CLC, said color filter causing said LCD to cooperate with said projector to project a colored light when said controllable CLC is in said "on" state, said LCD scattering said colored light when said controllable CLC is in said "off" state.

47. The method as recited in claim 46 wherein said color filter is a multicolor filter, said multicolor filter causing said LCD to cooperate with said projector to project a multicolored light when said controllable CLC is in said "on" state, said LCD scattering said colored light when said controllable CLC is in said "off" state.

48. The method as recited in claim 41 further comprising the step of locating a second circular polarizer on an opposite side of said second substrate from said controllable CLC, said second circular polarizer having a handedness that is opposite said predetermined handedness and said particular handedness, said second circular polarizer thereby blocking light transmitted through said controllable CLC when said controllable CLC is in said "on" state.

49. The method as recited in claim 48 further comprising the step of locating a color filter proximate said controllable CLC, said color filter causing said LCD to transmit a colored light when said controllable CLC is in said "off" state.

50. The method as recited in claim 49 wherein said color filter is a multicolor filter, said color filter causing said LCD to transmit a multicolored light when said controllable CLC is in said "off" state.

51. The method as recited in claim 41 further comprising the step of locating a polymer dispersed LC (PDLC) on an opposite side of said second substrate from said controllable CLC, said PDLC allowing said LCD to operate:

in a reflective mode wherein said PDLC is placed in an opaque state, and in a transmissive mode wherein said PDLC is placed in a transparent state and light passing through said PDLC and said controllable CLC passes through said circular polarizer.

52. The method as recited in claim 51 further comprising the step of locating a color filter proximate said second substrate, said color filter causing said light to be a certain color when said LCD operates in said transmissive mode.

53. The method as recited in claim 52 wherein said color filter is a multicolor filter, said light being multicolored when said LCD operates in said transmissive mode.

54. The method as recited in claim 41 wherein said controllable CLC contains a twist agent that determines an intrinsic color of said controllable CLC.

55. The method as recited in claim 41 further comprising the step of providing a drive circuit that generates a drive signal to selectively place said controllable CLC in said "on" and said "off" states.

56. The method as recited in claim 41 further comprising the step of arranging said controllable CLC in pixels.

57. The method as recited in claim 41 further comprising the step of forming a conductive matrix on said first and second substrates, said conductive matrix providing a path for drive voltage to be conveyed to said controllable CLC.

58. The method as recited in claim 57 wherein said conductive matrix defines pixel locations of said controllable CLC.

59. The method as recited in claim 41 further comprising the step of arranging said first and second substrates to be substantially parallel.

60. The method as recited in claim 41 wherein said predetermined handedness is right-handed.

* * * * *

UNITED STATES PATENT AND TRADEMARK OFFICE
CERTIFICATE OF CORRECTION

PATENT NO. : 5,796,454
DATED : August 18, 1998
INVENTOR(S) : Ma

It is certified that error appears in the above-indentified patent and that said Letters Patent is hereby corrected as shown below:

Col. 7, line 1 "monocolor" should be --mono-color--.

Signed and Sealed this

Twenty-fourth Day of November, 1998

Attest:

BRUCE LEHMAN

*Attesting Officer*     Commissioner of Patents and Trademarks